(12) United States Patent
Bartlett

(10) Patent No.: US 7,641,557 B2
(45) Date of Patent: Jan. 5, 2010

(54) FLEXIBLE COUPLING

(75) Inventor: Stephen Charles Bartlett, Romsey (GB)

(73) Assignee: GKN Driveline International, GmbH, Lohmar (DE)

( * ) Notice: Subject to any disclaimer, the term of this patent is extended or adjusted under 35 U.S.C. 154(b) by 0 days.

(21) Appl. No.: 10/521,911

(22) PCT Filed: Jul. 20, 2002

(86) PCT No.: PCT/EP02/08115

§ 371 (c)(1),
(2), (4) Date: Sep. 19, 2005

(87) PCT Pub. No.: WO2004/010018

PCT Pub. Date: Jan. 29, 2004

(65) Prior Publication Data

US 2006/0084510 A1    Apr. 20, 2006

(51) Int. Cl.
*F16D 3/42*    (2006.01)

(52) U.S. Cl. .......................................... 464/69; 464/125

(58) Field of Classification Search .................... 464/70, 464/87, 92, 100, 101, 112, 125, 126, 138, 464/69
See application file for complete search history.

(56) References Cited

U.S. PATENT DOCUMENTS

| | | | | |
|---|---|---|---|---|
| 239,952 | A | * | 4/1881 | Harvey ........................ 464/125 |
| 3,296,827 | A | * | 1/1967 | Landon et al. ................. 464/92 |
| 4,040,270 | A | | 8/1977 | Chivari |
| 4,121,437 | A | * | 10/1978 | Michel ......................... 464/70 |
| 4,591,350 | A | * | 5/1986 | Obermeier .................. 464/138 |
| 4,804,352 | A | * | 2/1989 | Schmidt |
| 4,897,073 | A | | 1/1990 | Chivari |
| 6,325,722 | B1 | * | 12/2001 | Ciotola |

FOREIGN PATENT DOCUMENTS

FR    2 176 214    10/1973

* cited by examiner

*Primary Examiner*—Greg Binda
(74) *Attorney, Agent, or Firm*—Rader, Fishman & Grauer, PLLC

(57) ABSTRACT

A flexible coupling capable of transmitting moments and comprising a first member having a longitudinal axis (30) connected by at least three joints (27) to a second member (41) having a longitudinal axis substantially aligned with the longitudinal axis of the first member, the joints being circumferentially spaced apart about said axis, each joint comprising a first part (27) on one of the members and a second part (31) on the other member, the parts of each joint interfitting so that moments can be transmitted between said members by the joints and so that relative sliding and rotational movement can take place between the parts of teach joint, the joint parts on at least one of the members being flexibly arranged (41) so that the members may articulate relative to one another.

16 Claims, 13 Drawing Sheets

FLEXIBLE COUPLING

TECHNICAL FIELD

This invention relates to a flexible coupling. The invention is particularly applicable to flexible couplings which include parts made of plastic material, e.g. fiber reinforced epoxy, polyamide or other resin.

BACKGROUND ART

Numerous types of flexible couplings are known for connecting two shafts in driving engagement. In one type, there is a thin flexible disc to which each shaft is joined by three, circumferentially-spaced, bolted or other rigid connections. Such connections impose strains on the disc in addition to those required for torque transmission and articulation. These strains are associated with additional stresses which reduce the torsional strength and fatigue life of the coupling.

The present invention provides a coupling in which shafts, for example, may be joined to a flexible element by connections with additional degrees of freedom so that the stresses and strains on the flexible element are reduced as compared with the above type of coupling and the life of the coupling thereby increased.

The present invention also increases, with respect to prior art couplings, the maximum articulation angle of the coupling as well as its maximum continuous running angle. Further, the invention provides a coupling in which the stresses are reduced so that the coupling may include a flexible element made from a relatively low cost plastic material, such as fiber-reinforced epoxy, polyamide or other resin, and which may be manufactured easily, for example by injection molding.

The coupling of the invention may also be used as a static coupling for connecting two non-rotating parts so that moments may be transmitted across the coupling.

SUMMARY OF THE INVENTION

According to one aspect of the invention we provide a flexible coupling capable of transmitting moments and comprising a first member having a longitudinal axis connected by at least three joints to a second member having a longitudinal axis substantially aligned with the longitudinal axis of the first member, the joints being circumferentially spaced apart about said axes, each joint comprising a first part on one of the members and a second part on the other member, the parts of each joint interfitting so that moments can be transmitted between said members by the joints and so that relative sliding and rotational movement can take place between the parts of each joint, the joint parts on at least one of the members being flexibly arranged so that the members may articulate relative to one another.

According to a second aspect of the invention we provide a flexible coupling capable of transmitting torque and comprising a first member having a rotary axis connected by at least three joints to a second member having a rotary axis, the joints being circumferentially spaced apart about said axes, each joint comprising a first part on one of the members and a second part on the other member, the parts of each joint interfitting so that torque can be transmitted between said members by the joint and so that relative sliding and rotational movement can take place between the parts of each joint, the joint parts on at least one of the members being flexibly arranged so that the members may articulate relative to one another.

According to a third aspect of the invention we provide a flexible coupling capable of transmitting torque from a first member having a rotary axis via a second member to a third member having a rotary axis, the first member being connected to the second member and the second member being connected to the third member by joints, there being at least three joints between the first and second members and between the second and third members respectively, the joints being circumferentially spaced about said axes, each joint comprising a first part on one of the members which is connected by the joint and a second part on the other connected member, the parts of each joint interfitting so that torque can be transmitted between said members by the joint and so that relative sliding and rotational movement can take place between the parts of each joint, the joint parts on at least one of the members being flexibly arranged so that the first and third members may articulate relative to one another.

Each joint may comprise a pin carried by one of the members and a socket carried by the other member, the pin fitting into the socket so that torque can be transmitted by the joint and so that relative sliding and rotational movement can take place between each pin and the socket which receives it.

The joint parts may be mounted flexibly on only one member or may be mounted flexibly on more than one member.

The pins or sockets may be mounted on a ring and interconnected by flexible elements or the pins and/or sockets may be mounted on a rigid member to which they are connected by flexible elements.

The longitudinal axes of the sockets and pins may be in a single plane or the axes of some of the sockets and pins may lie in one plane and the longitudinal axes of the remaining sockets and pins lie in a second plane parallel to the first plane.

The sockets and/or pins may be connected by flexible elements which are bowed in shape.

The sockets may be formed by inserts received in bores in a ring, the bores being flexibly interconnected. The pins may have part-spherical heads received in cylindrical bores in the sockets or they may have cylindrical surfaces which are engaged with cylindrical bores in the sockets or inserts. The joints may be pin and socket joints with the pins detachably connected to the member on which they are carried.

The first member may comprise a wheel having internally projecting radial pins, the second member comprising a ring on which sockets are mounted, the sockets being inter-connected by flexible members, some of the sockets receiving the pins on the wheel and the third member having outwardly projecting pins which are received in the remainder of the sockets. The sockets may contain inserts in the form of bushes in which the pins are received. The inserts may be a snap-fit into the sockets.

The coupling may include a flexible annular disc having sockets secured thereto at positions spaced equi-angularly about the disc and two members each having a rotary axis and a plurality of outwardly projecting pins and wherein the pin's of each of the two members are received in alternate sockets on the disc. All the sockets may be arranged to project inwardly from the disc and the pins on the members project outwardly. Alternatively the sockets may project inwardly and outwardly from the disc and each of said members may have radially inwardly and outwardly directed pins which are received in the inwardly and outwardly directed sockets respectively.

The coupling may include sockets formed in or carried by a ring which comprises two parts which are detachably secured together, each said ring part providing a portion of each socket so that when the ring parts are secured together the socket portions are aligned to form the sockets, each ring part including flexible elements which inter-connect the socket portions on the ring part. The ring parts may be identical and may clip together. The ring parts may be prevented from becoming detached from each other by inserts received in the sockets and which receive the pins.

DETAILED DESCRIPTION

Figure 1:
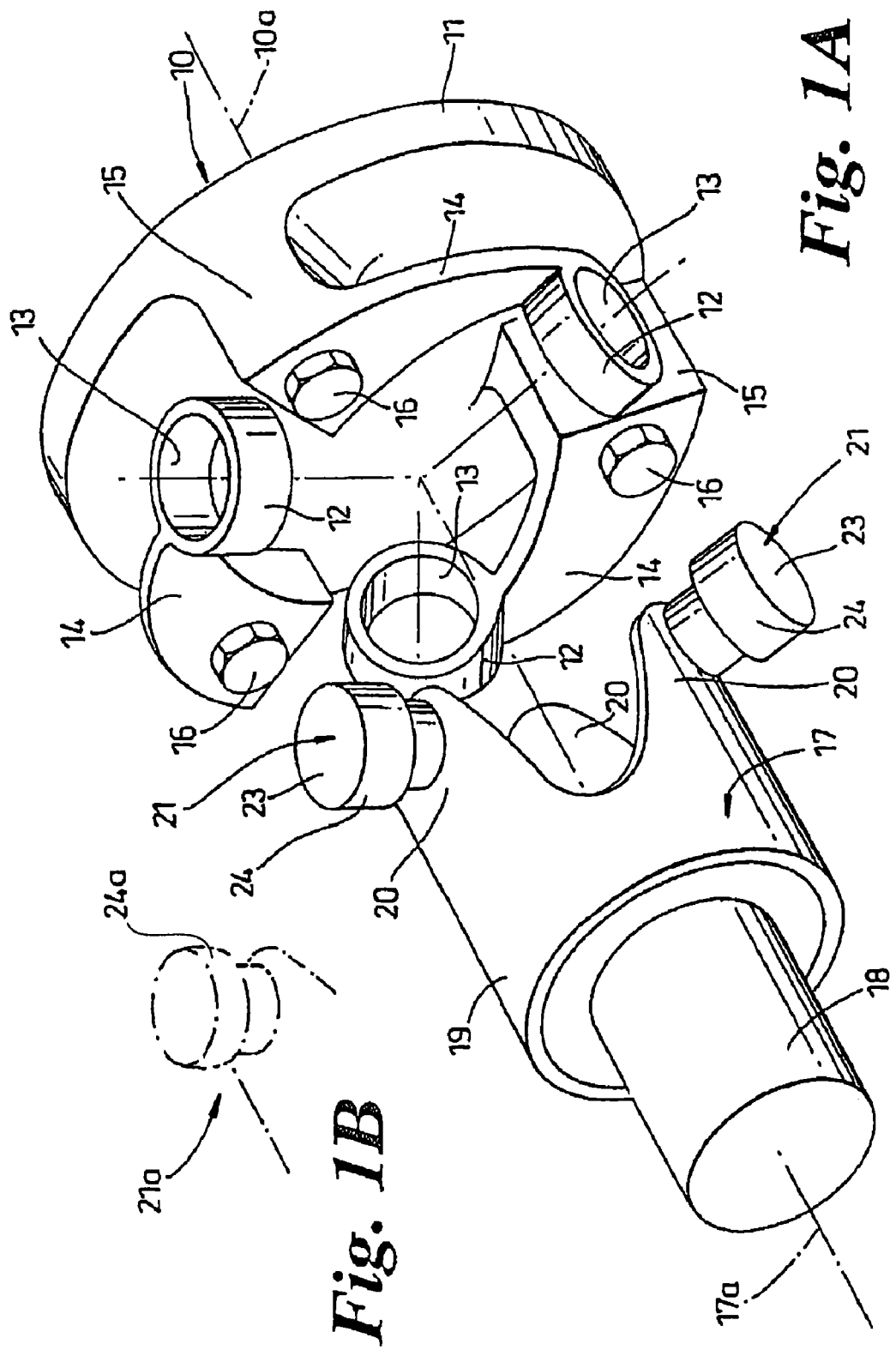
FIG. 1A is an exploded perspective view of a first embodiment of the invention.
FIG. 1B illustrates an alternative type of trunnion.

Referring now to FIG. 1A, the coupling comprises a first member 10 having a rotary axis 10a and which includes an element 11 for receiving or transmitting drive from or to the first member. The member carries three cylindrical sockets 12 each of which has a cylindrical bore 13. The sockets 12 are connected to the element 11 by flexible elements 14 and by parts 15. Preferably the parts 11, 12, 14 and 15 are made as a single moulding of, for example, fibre-reinforced polyamide. The fibre reinforcement may be glass fibre. The member 10 may be joined to a companion flange, not shown, by bolts 16. The longitudinal axes of the bores 13 lie in a single plane and the sockets 12 are equi-angularly spaced about the rotary axis 10a.

The coupling includes a second member 17 having a rotary axis 17a substantially aligned with the axis 10a and which has a shaft 18 and a tubular part 19. The second member can conveniently be made of metal, e.g. steel, and has three arms 20 projecting from the end thereof. Each arm carries a trunnion 21, the trinnions being equi-angularly spaced about the axis 17a, and each trunnion has a reduced-section neck portion 22 and a head 23 which has a cylindrical surface 24, longitudinal axes of the surface 24 lying in a plane perpendicular to the axis 17a.

The coupling is assembled by inserting the heads 23 of the trunnions 21 into the bores 13 of the sockets 12. The orientation and position of the sockets 12 is such that the relative movement of the first and second members is constrained in directions parallel to the plane containing the longitudinal axes of the bores 13. The heads 23 of the trunnions can slide and rotate in the bores 13 and this, and the flexibility of the elements 14, permits some articulation between the rotary axes 10a and 17a of the first and second members 10 and 17 and allows a small amount of relative axial movement between the members 10 and 17. Each socket 12 and trunnion 21 forms a joint to transmit torque between the first and second members, the joints being pin and socket joints. The trunnions 21 may be detachably connected to the member 17 to ease assembly.

FIG. 1B shows an alternative type of trunnion 21a having a part spherical surface 24a. The centres of these surfaces for all the trunnions lie in a plane perpendicular to the rotary axis 17a.

Figure 2:
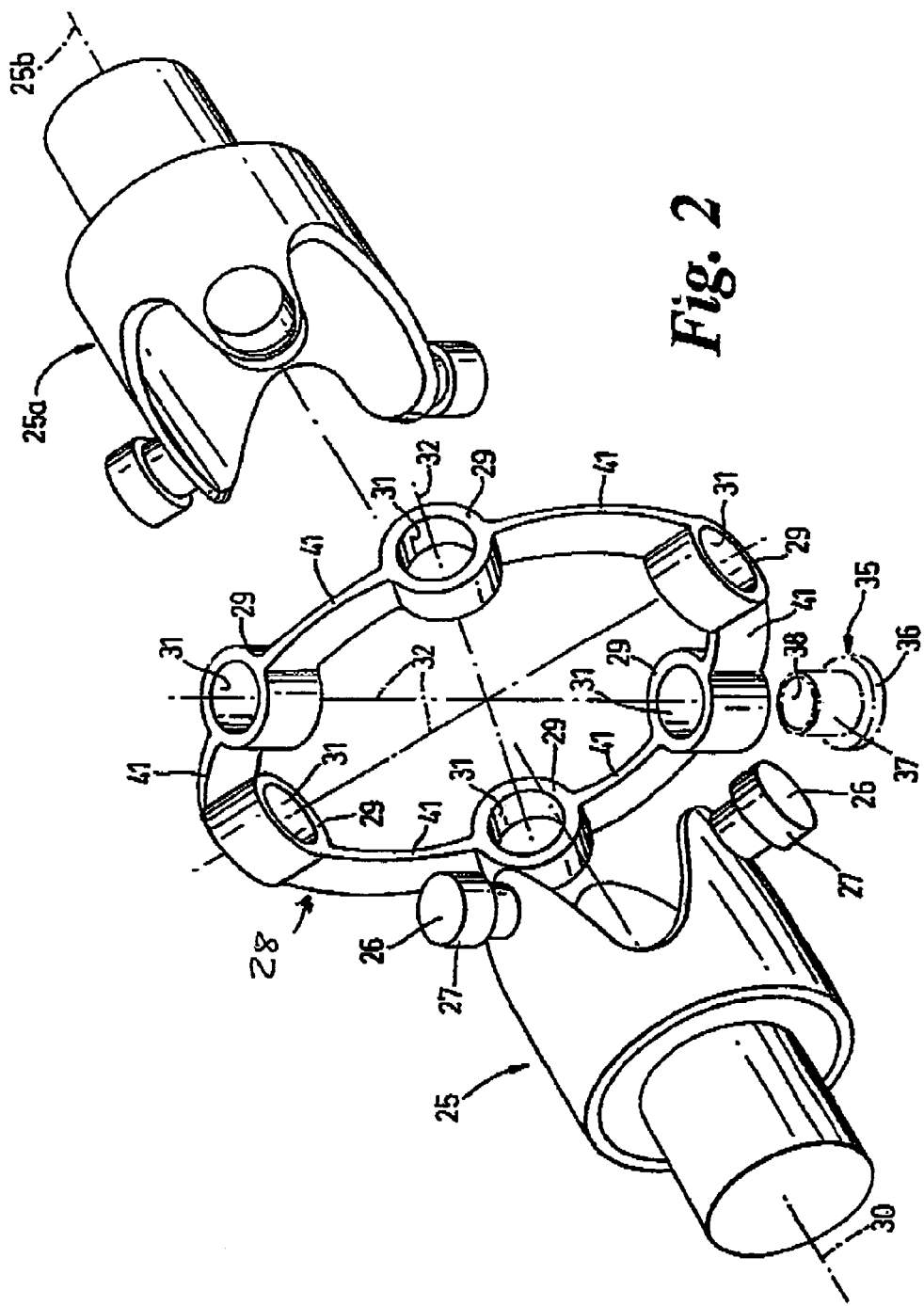
FIG. 2 is an exploded perspective view of a second embodiment of the invention.

Turning now to FIG. 2, the coupling comprises three members; the first and third members are identical. The first member is indicated generally at 25 and is identical in, construction to the second member 17 shown in FIG. 1A and will not be described further except to say that the trunnions have heads 26 with circumferential cylindrical surfaces 27. The third member is shown at 25a, is identical to the first member 25 and has a rotary axis 25b.

The second member 28 consists of six sockets 29 equi-angularly spaced around the rotary axis 30 and each having a cylindrical bore 31. The longitudinal axes of the bores 31, which are indicated at 32, are equi-angularly spaced around the rotary axis 30 and all lie in a single plane. The coupling is assembled by inserting the heads 27 of the trunnions on the first member 25 into alternate ones of the bores 31 and inserting the heads of the trunnions of the third member 25a into the remaining bores 31.

The heads of the trunnions can slide and rotate in the bores but the orientation and position of the bores is such that relative movement of the members to one another in the plane containing the longitudinal axis of the bores 31 is constrained.

The sockets 29 are interconnected by flexible elements 41 which are thinner in the middle than at the ends and which form a ring with the sockets 29 so that the second member 28 can be moulded as one piece. The flexible elements 41 are parallel to and include the plane containing the axes 32 of the bores 31. Articulation of the first and third members is permitted by the flexibility of the elements 41 and the movement of the trunnion heads in the bores 31. Some relative axial movement is also permitted by the flexibility of the elements 41. As in FIG. 1A, each socket 29 and trunnion forms a pin and socket joint connecting the first member to the second member or the second member to the third member.

The heads of the trunnions may be steel part-spherical elements instead of steel cylinders such as indicated. The part-spherical shape would be used where the misalignment between the rotary axes 30 and 25b of the first and third members is more than minimal and only a low torque has to be transmitted because there would be a high contact pressure between the spherical surface and the bores 31. The cylindrical heads 26 would be used where there is a low angle of misalignment between said axes and high torque is to be transmitted since the contact pressures between the cylindrical surface and the bores would be less.

To aid assembly, the bores 31 may be fitted from the interior or exterior of the member 28 with plugs one of which is indicated at 35 having a flange 36 at one end and a tubular portion 37 at the other. The tubular portion 37 fits into the bore 31 and the head 26 of a trunnion would fit into the bore 38 of the tubular portion. The plugs 35 may be made of a wear-resistant or self-lubricating material. The trunnions could also be detachable.

Figure 3:
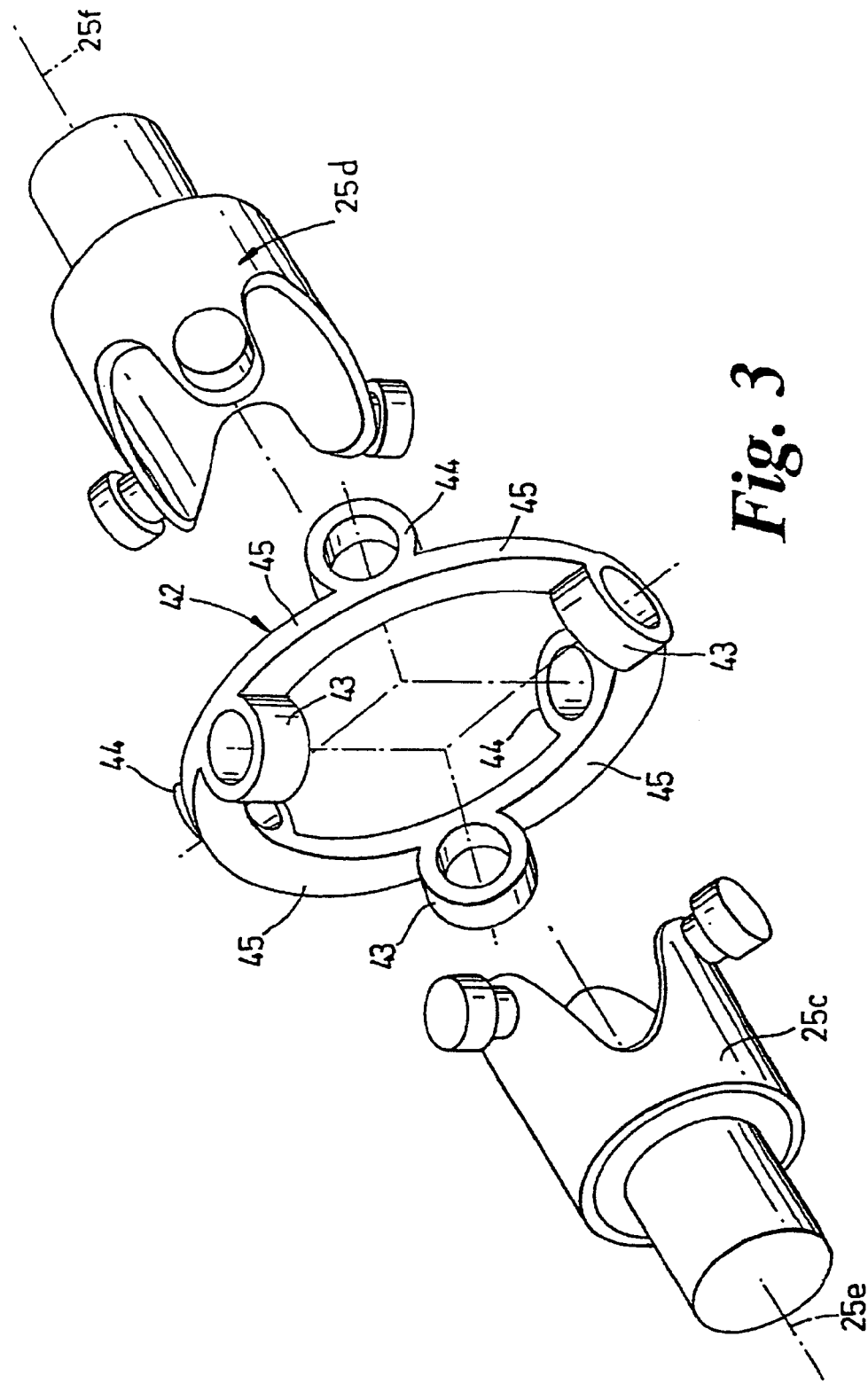
FIG. 3 is an exploded perspective view of a third embodiment of the invention.

Referring now to FIG. 3, this shows a coupling which is similar to FIG. 2 except that the sockets on the second member 42 are arranged on both sides thereof. Thus there are three sockets 43 which are equi-angularly spaced on one side and three sockets 44 which are equi-angularly spaced on the other side of the member. All the sockets are equi-angularly spaced around the rotary axes of the coupling. The longitudinal axes of the bores in the sockets 43 lie in one plane perpendicular to the rotary axis of the member 42 and the longitudinal axes of the bores of the sockets 44 lie in a second and parallel plane. The sockets are inter-connected by flexible elements 45. The member 42 is preferably molded in one piece from fiber-reinforced plastic, e.g. glass-reinforced polyamide. Such a coupling can accommodate, as well as angular misalignment, a small radial misalignment between the first and third members 25c and 25d which have substantially aligned rotary axes 25e and 25f respectively.

Figure 4:
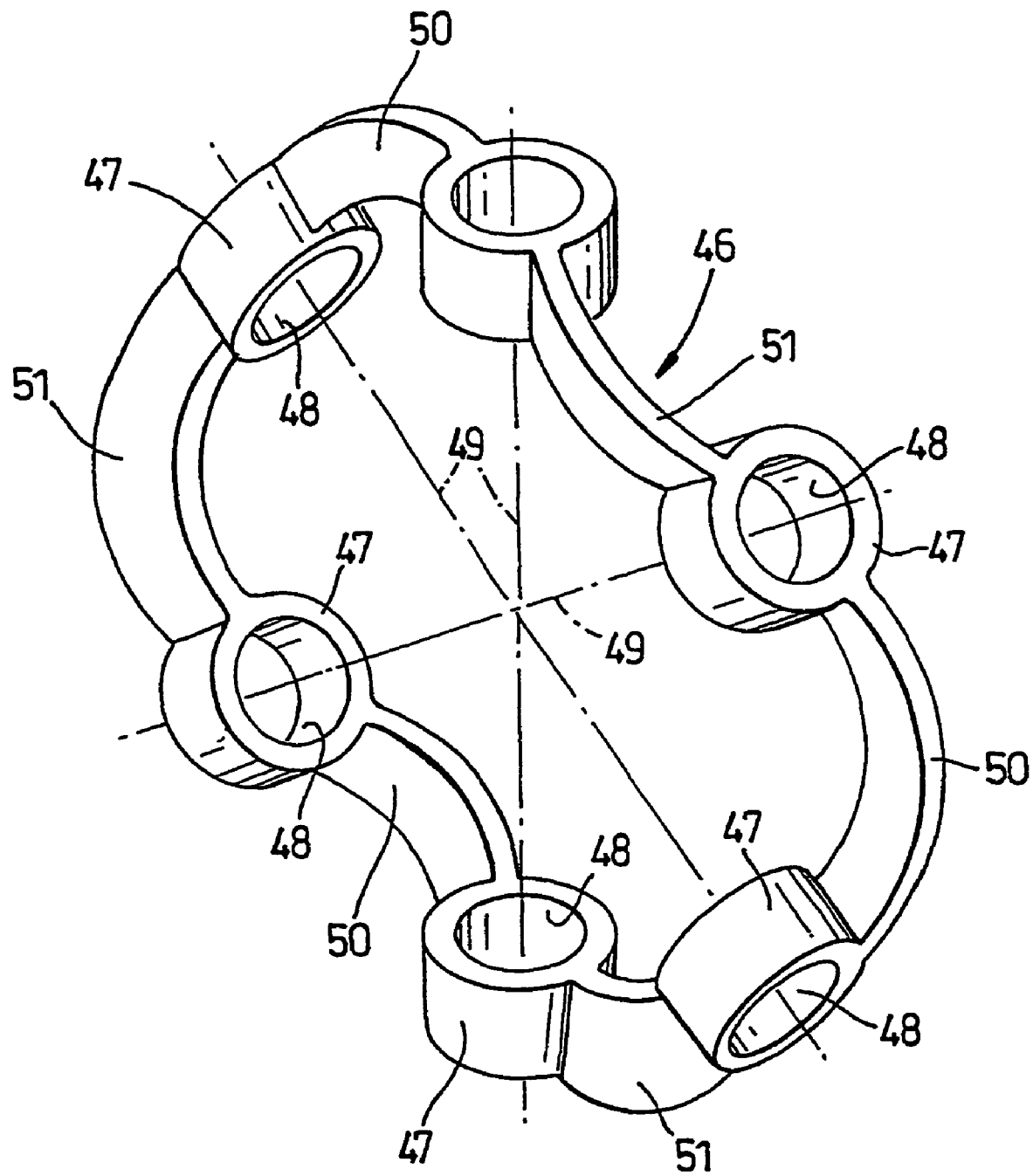
FIG. 4 is a perspective view of a form of torque transmitting member which may be used in a coupling according to the invention.

FIG. 4 shows the second member 46 for a coupling such as shown in FIG. 2 or FIG. 3 of somewhat different shape. The member has six sockets 47 each of which has a cylindrical bore 48. The longitudinal axes of the bores are indicated by the lines 49 all of which lie in the same plane. The flexible elements 50, 51 which join the sockets 47 are in this instance curved so that they lie alternately on different sides of the plane containing the longitudinal axes of the bores 48. Thus the flexible elements 50 lie on one side of the plane and the flexible elements 51 lie on the other side of the plane.

The advantage of this construction is that it has increased torsional compliance and articulation capability. Also if there is a tendency for the flexible elements 50 or 51 to buckle during operation they will not buckle in a bi-stable way, i.e. they will not move from one side of the plane containing the longitudinal axes to the other during operation of the coupling.

Figure 5:
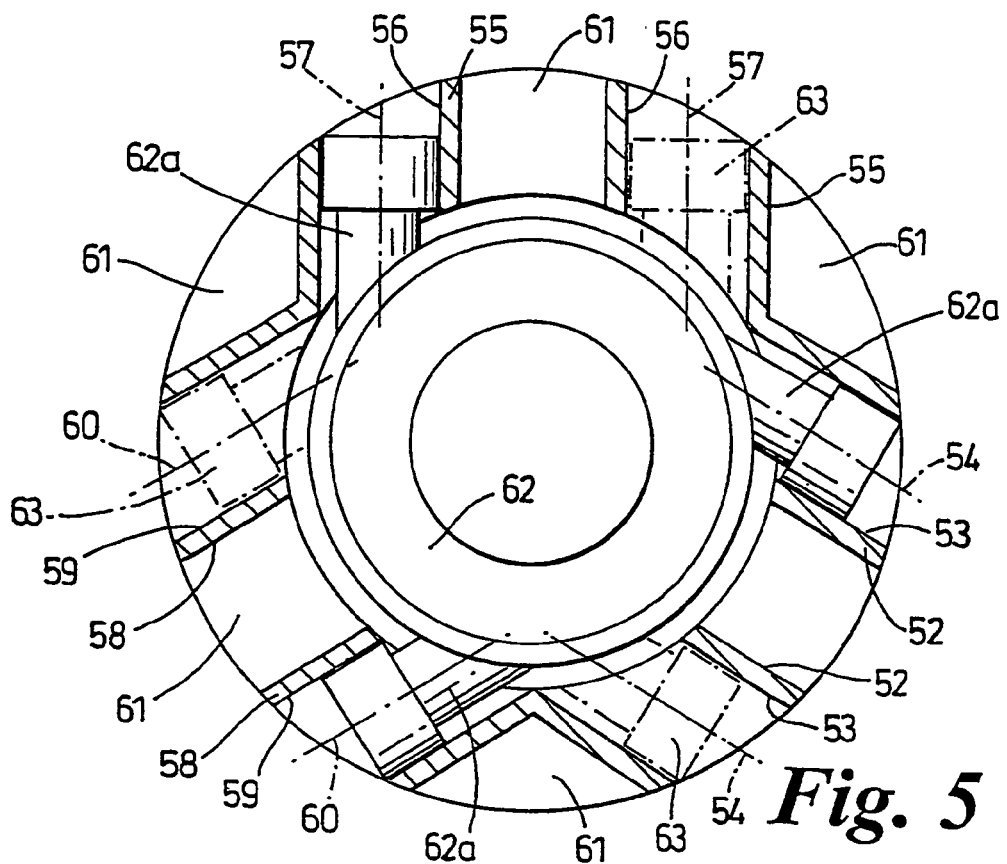
FIGS. 5 and 6 are cross-sections through additional forms of torque-transmitting members.

Referring now to FIG. 5, this is a cross-section through another form of second member of a coupling similar to that of FIG. 2 or FIG. 3 in which the sockets are arranged in parallel pairs. Thus there are sockets 52 which have bores 53 with parallel longitudinal axes 54, there are sockets 55 which have bores 56 with parallel longitudinal axes 57 and there are sockets 58 which have bores 59 with parallel longitudinal axes 60. The sockets are inter-connected by flexible elements 61 in a manner similar to FIG. 3. The first and third coupling members will have trunnion heads which engage in alternate sockets. Thus the trunnions 62a (shown in full lines) of the first member 62 engage in one each of the sockets 52, 55 and 58 and the trunnions 63 (shown in dotted lines) of the third member, not shown, engage in the other alternate sockets.

Figure 6:
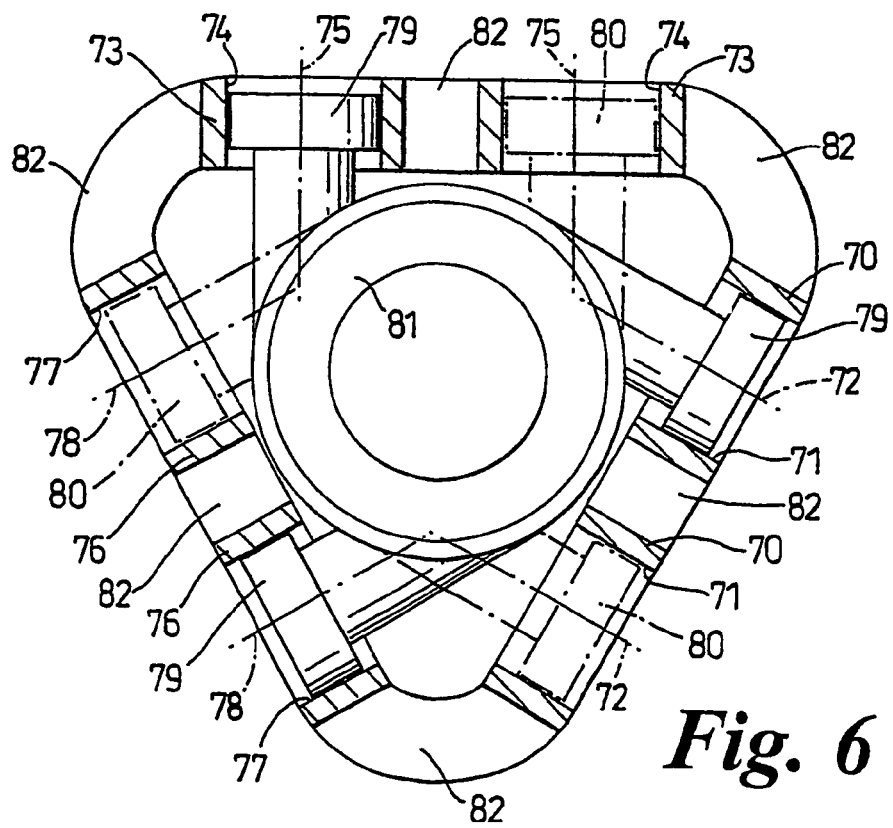

FIG. 6 shows an arrangement similar to FIG. 5 in which there are sockets in pairs with parallel axes. Thus there are sockets 70 having bores 71 with parallel longitudinal axes 72; sockets 73 having bores 74 with parallel longitudinal axes 75 and sockets 76 having bores 77 with parallel longitudinal axes 78. The bores are shown containing the heads of the trunnions of the first and second members thus the heads of the trunnions of the first member 81 are indicated in full lines at 79 and those of the third member in dotted lines at 80.

Both in FIG. 5 and in FIG. 6 the trunnions are slidable and rotatable in the bores of the sockets but the orientations and positions of the bores constrain the first and third members in the plane containing the longitudinal axes of the sockets. All the longitudinal axes of the sockets lie in a single plane. There are flexible elements 82 interconnecting adjacent sockets as described in relation to FIG. 3.

Figure 7:
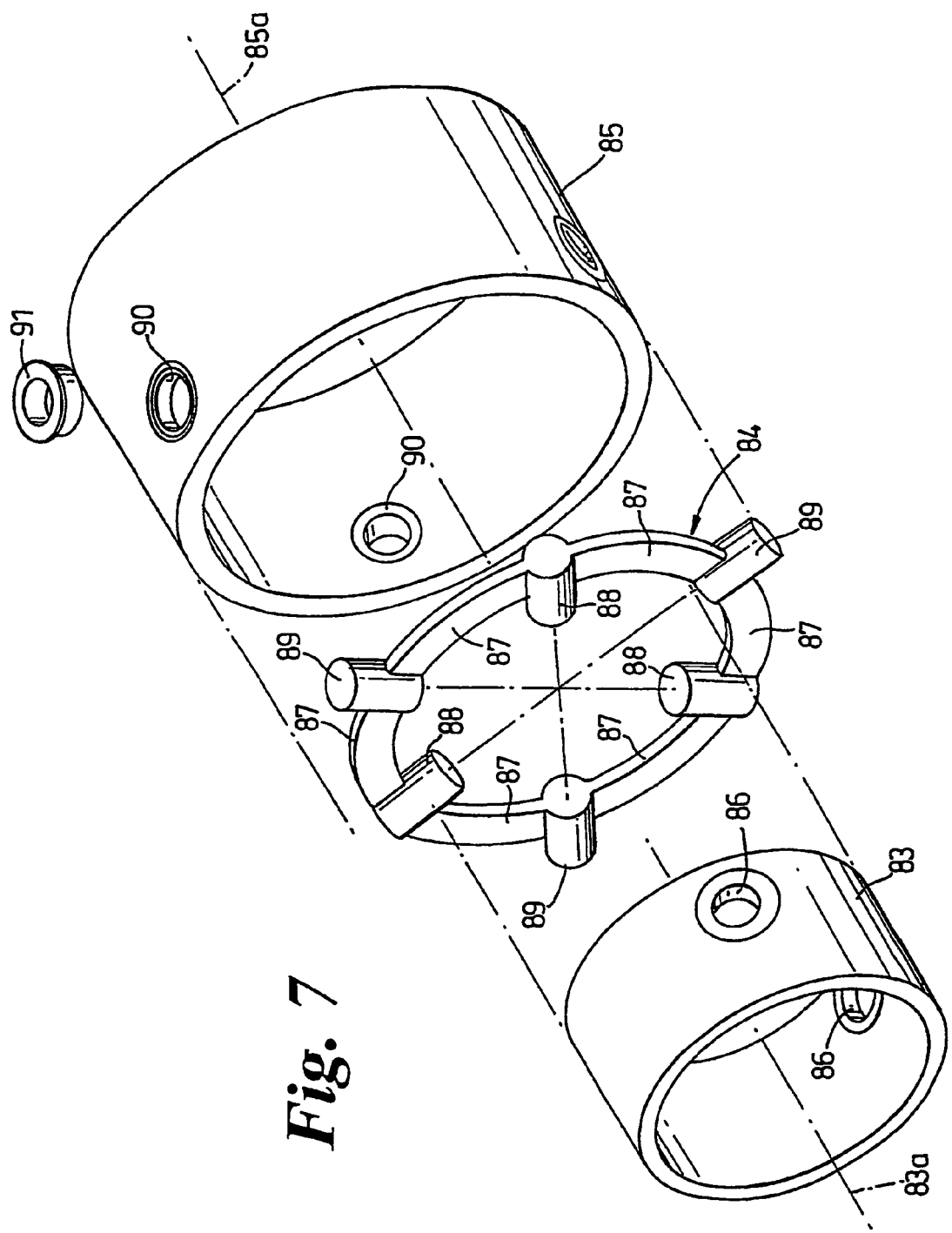
FIG. 7 is an exploded perspective view of a further embodiment of the invention.

Referring now to FIG. 7, this shows a three member coupling in which there is a first member 83, a second member 84 and a third member 85. The first and third members have substantially aligned rotary axes 83a and 85a respectively. The first member 83 is cylindrical and has three sockets formed in the circumference thereof, two of the sockets being indicated at 86 and the sockets being equi-angularly spaced around the rotary axis of the member 83. The second member, 84, is in the form of a one-piece molding and comprises six pins interconnected by flexible elements 87 in the form of a ring. Three of the pins 88 project inwardly from the ring and three of the pins 89 project outwardly from the ring.

The third member 85 is a cylindrical member similar to the first member 83 and is also provided with three sockets 90 equi-angularly spaced around the member. The sockets 86 and 90 may have inserts 91 similar to the inserts 35 described in relation to FIG. 2.

The pins 88 fit into the sockets 86 and the pins 89 fit into the sockets 90. Thus the first member 83 is connected to the second member 84 by pin and socket joints allowing rotation and sliding between the parts of each joint and the second member 84 is connected to the third member also by similar pin and socket joints. Torque will be transmitted from the first member 83 to the third member 85 through these joints and articulation between the first and third members 83 and 85 and some axial movement will be permitted by the flexibility of the portions 87.

Figure 8:
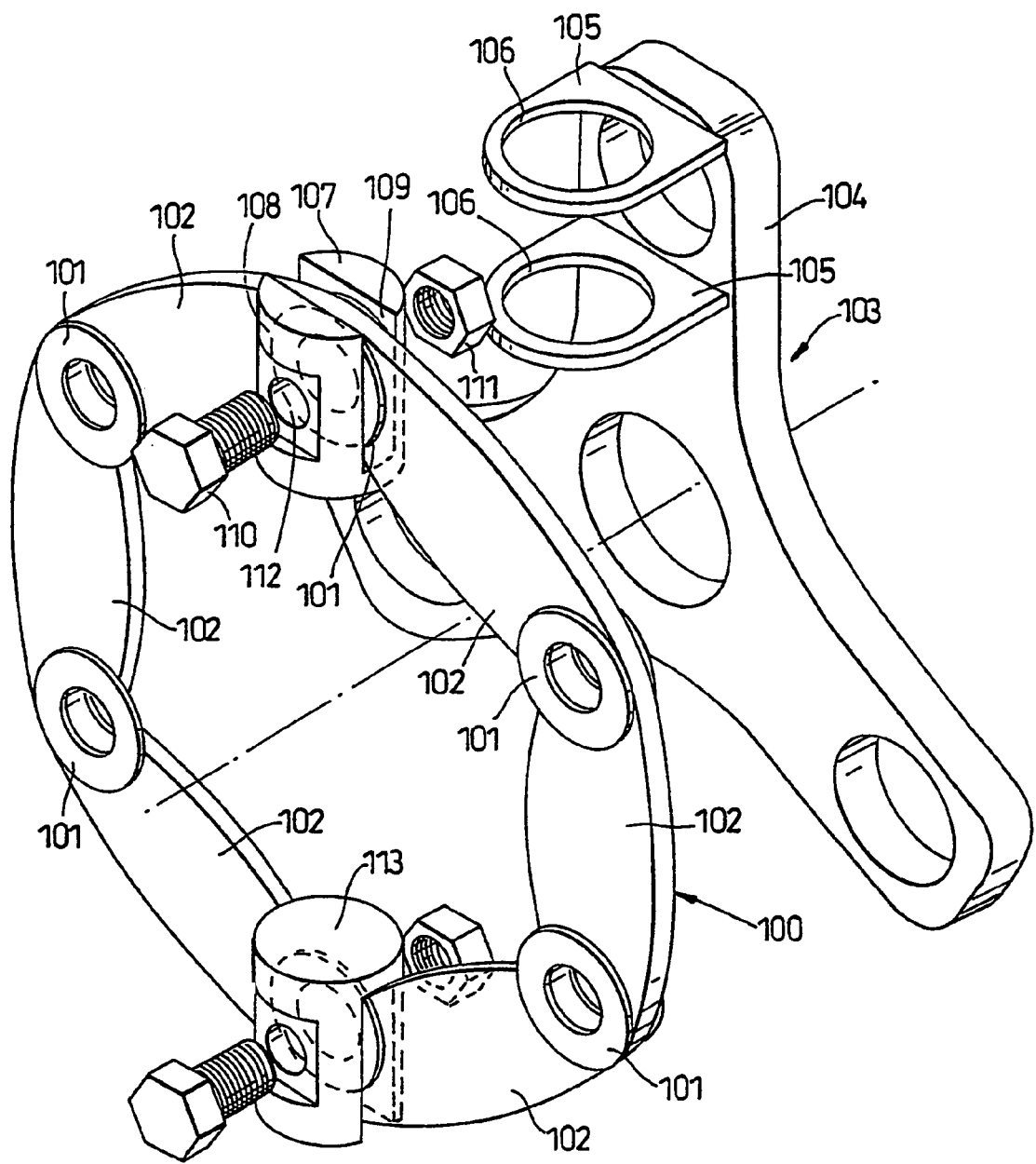
FIG. 8 is a partial exploded perspective view of a still further embodiment of the invention.

Referring now to FIG. 8, a conventional flexible disc is indicated at 100. The disc comprises six fixing bosses, some of which are shown at 101 interconnected by flexible leaves 102. One example of such a coupling is shown in DE-A-41 40 311. A three-armed spider is indicated at 103 and on the arm 104 are secured two brackets 105 having circular apertures 106. Mounted on one of the bosses 101 is a pin 107. The pin has a cylindrical outer surface 108 and a central slot 109. The boss 101 is received in the slot 109. The pin 107 is held in position on the disc 100 by a bolt 110 and a nut 111. The bolt is received in circular bores 112 in the pin 107 which are provided on each side of the slot 109. The bolt passes through the bores 112 and receives the nut 111.

When the coupling is assembled, the pin 107 is received in the apertures 106 in the brackets 105. Thus a pin and socket connection is provided the pin being provided by the pin 107 and the socket by the apertured brackets 105. The pin can slide radially and rotate within the apertures 106. Although not shown, each arm of the spider 103 would have brackets such as 105 receiving pins such as 107 and there would be a second spider which would receive similar apertured pins such as 113.

In practice, the coupling would be assembled by placing the disc within the brackets 105 in each spider and then assembling the pins from the inside by moving them radially outwardly into the apertures 106 and then securing the pins to the disc by the bolts and nuts 110 and 111.

Figure 9:
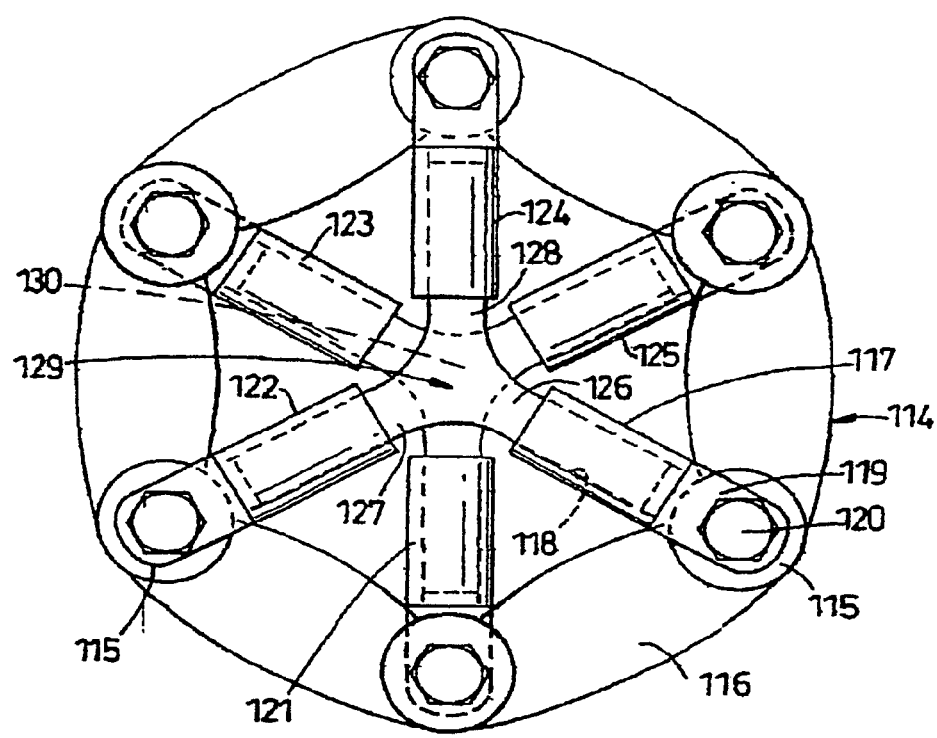
FIG. 9 is a diagram of another embodiment of the invention.

Referring now to FIG. 9, this shows, in diagrammatic form another coupling. As in FIG. 8, there is a conventional flexible disc 114 having six, equi-angularly spaced bosses 115 interconnected by flexible leaves 116. To each boss is connected a cylindrical socket such as 117, three on one side of the disc and three on the other. Each socket has a cylindrical bore 118 and a lug 119 at its radially outer end. The lug is secured to a boss 115 in a pivotal manner by means of a bolt assembly 120. Each of the bosses of the coupling is provided with a socket similar to the socket 117 and these are indicated at 121, 122, 123, 124 and 125. The sockets 117, 122 and 124 are on one side of the disc and receive the arms 126, 127 and 128 respectively of a three-armed spider 129. The arms 126, 127 and 128 are cylindrical and can slide and turn in the bores 118 of the sockets. The similar arms of a second spider 130 are received in the sockets 121, 123 and 125.

In every case the arms of the spiders are cylindrical and can slide and turn in the sockets and the sockets are flexibly interconnected by the leaves 116 of the composite disc.

Figure 10:
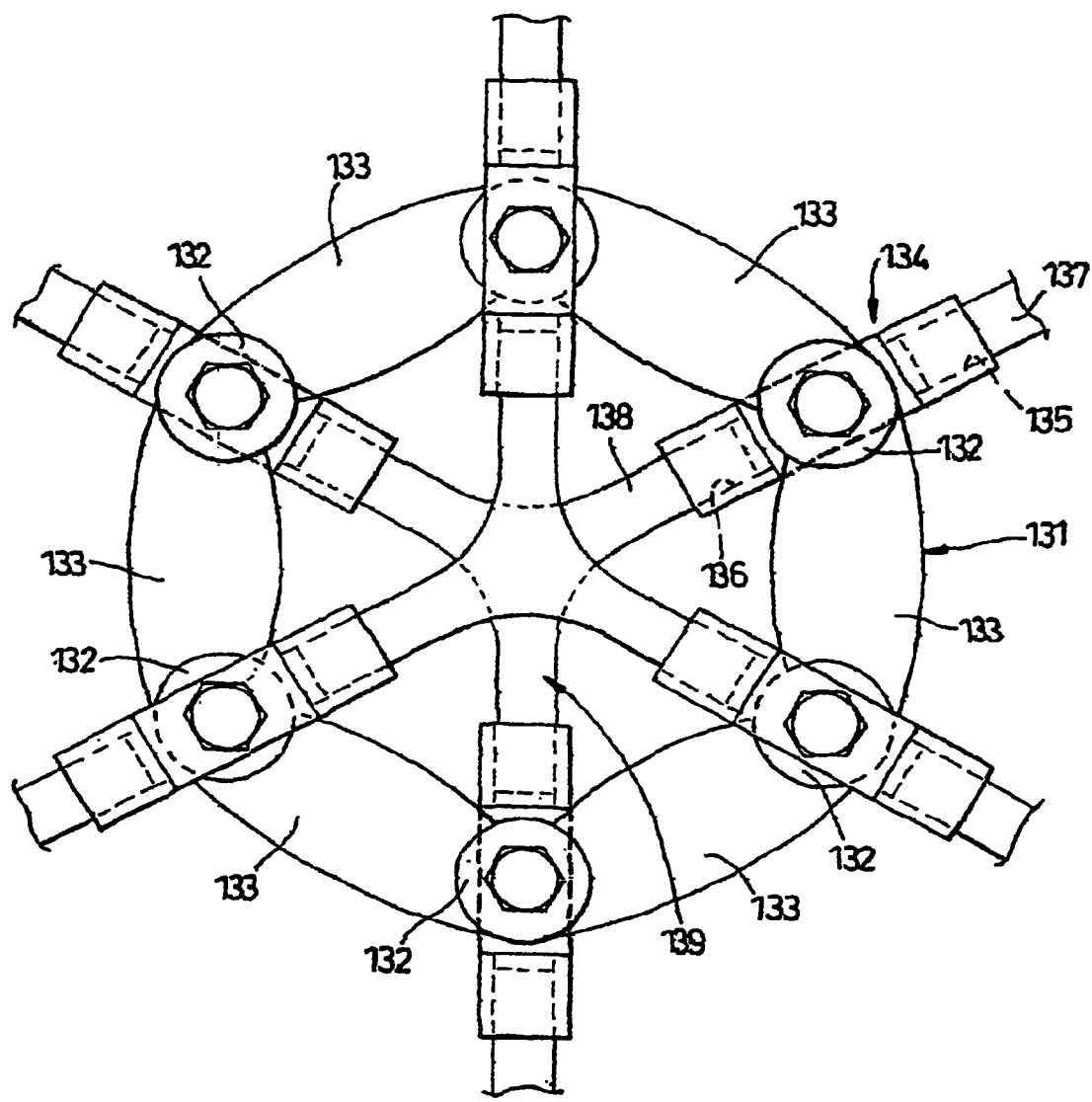
FIG. 10 is a diagram of another embodiment similar to FIG. 9.

FIG. 10 shows an arrangement similar to FIG. 9. Thus there is a composite disc 131 having bosses such as 132 connected by flexible leaves 133. Connected to each boss 132 is a socket one of which is indicated at 134. Each socket has two oppositely-facing bores 135 and 136 and in each is received a pin 137 and 138 respectively. The pins 137 and 138 are carried by an arm of a spider, the pins 137 being looped over and connected to the pins 138. This looping over has been omitted from FIG. 10 for clarity.

There are six sockets such as 134, three of which are connected to the arms of one spider and three of which are connected to the arms of the other. Three of the sockets are on one side of the disc and three on the other. The pins connected to the spider arms can slide and rotate in the sockets and the sockets are flexibly interconnected by the leaves 133 of the composite disc.

Figure 11:
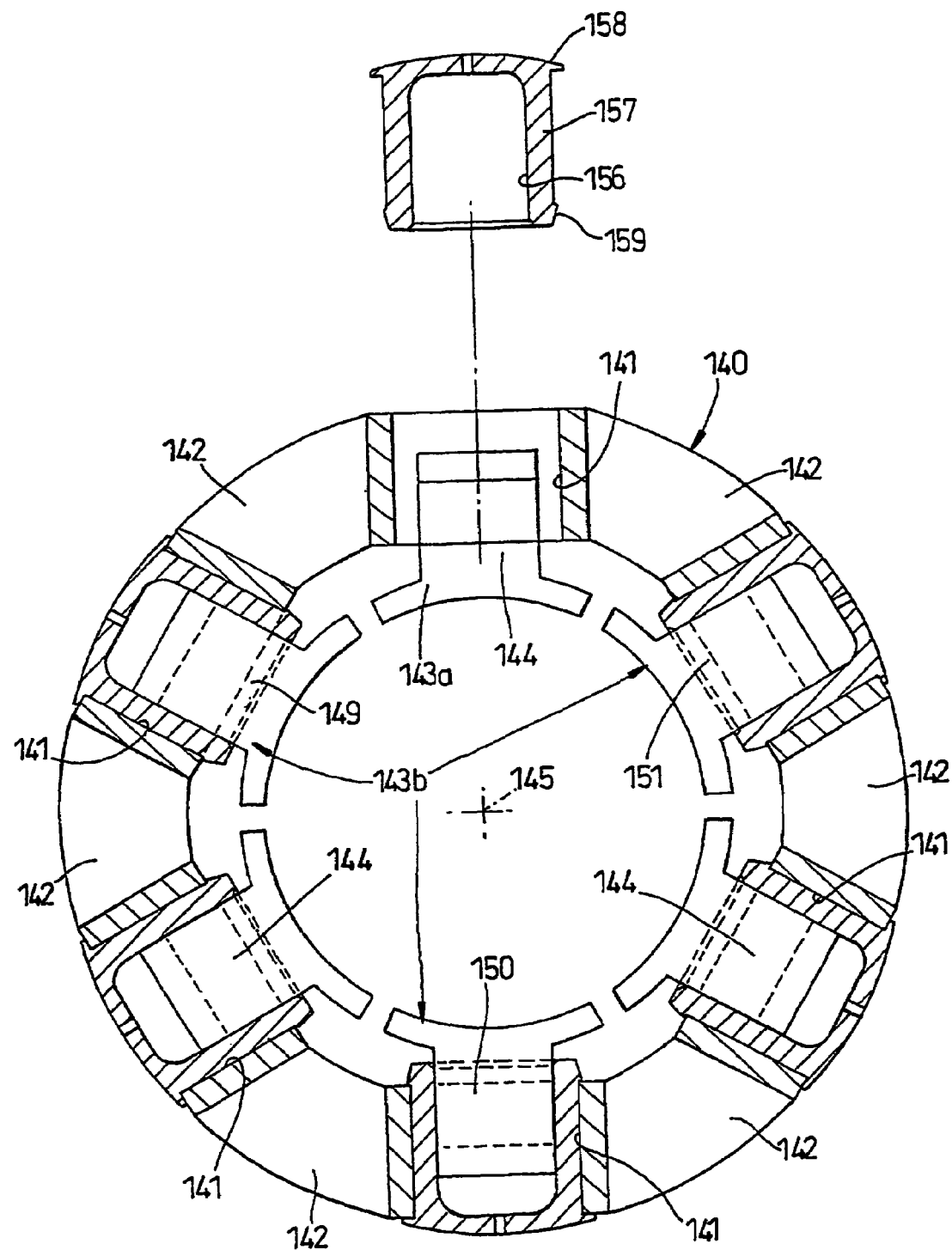
FIG. 11 is a section through a further embodiment of the invention.

Referring now to FIG. 11, there is shown a ring 140 made of composite material and this has six bores 141 equi-angularly spaced around the axis of the ring. The bores are interconnected by flexible leaves 142. Two spiders 143a and 143b complete the coupling. The spider 143a has, referring to FIG. 11, three pins 144 extending radially and equi-angularly spaced around the rotary axis 145. Each pin is received in the bore 156 of a socket 157 having flange 158 at its closed end. The socket is received in a bore 141.

Each pin can rotate and slide in its socket. There are three other pins 149, 150 and 151 carried by the other spider 143b which slide in sockets similar to the socket 157 which are received in the bores 141. This arrangement makes for ease of assembly since the ring can be assembled to the two spiders and then the sockets assembled onto the pins of the spiders. The sockets 157 have projections 159 at their open ends which snap under the inner end of the sockets 141 to hold the sockets 157 in place as shown in FIG. 11.

Figure 12:
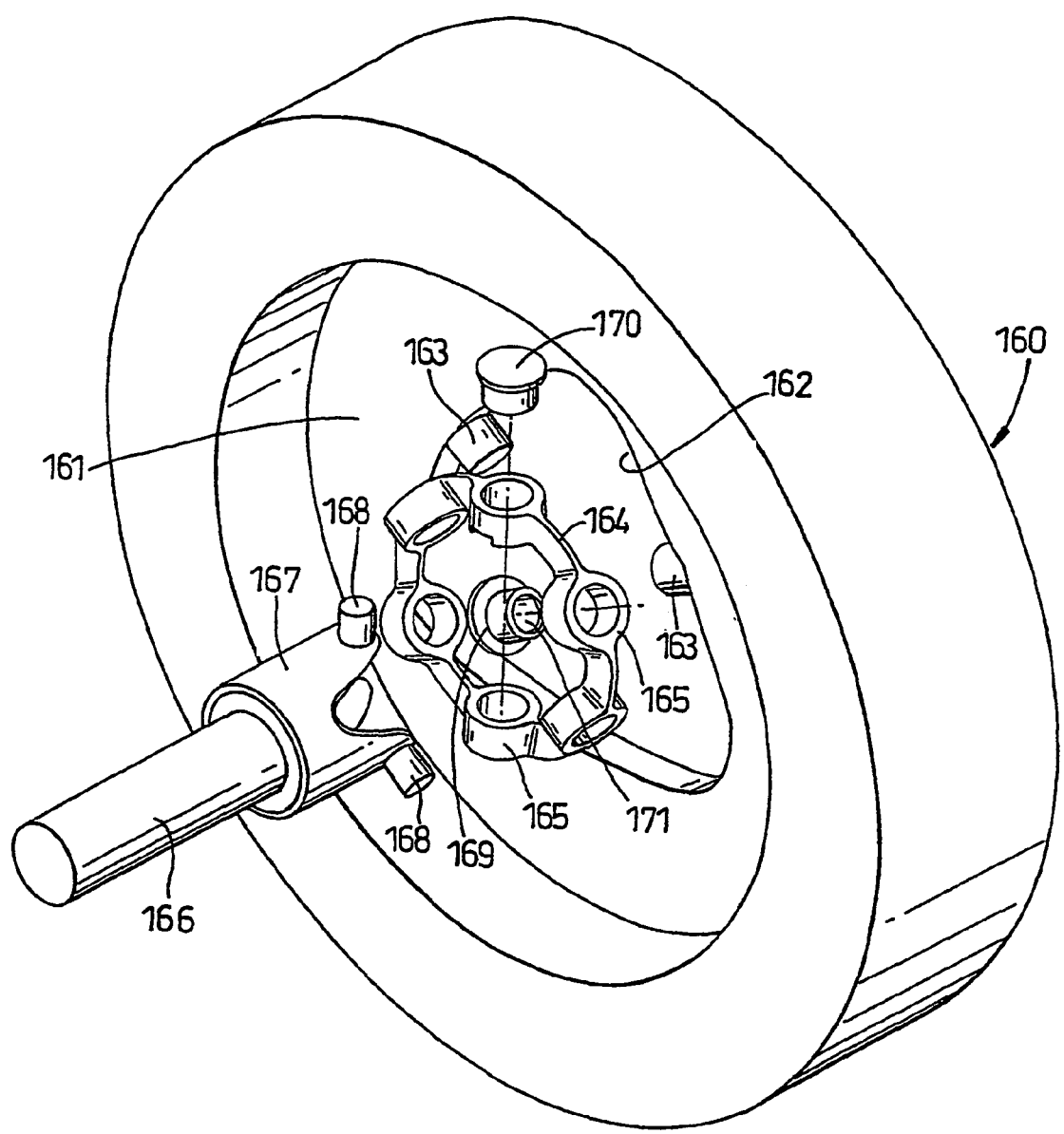
FIG. 12 is an exploded perspective view showing the invention applied to a wheel.
Figure 13:
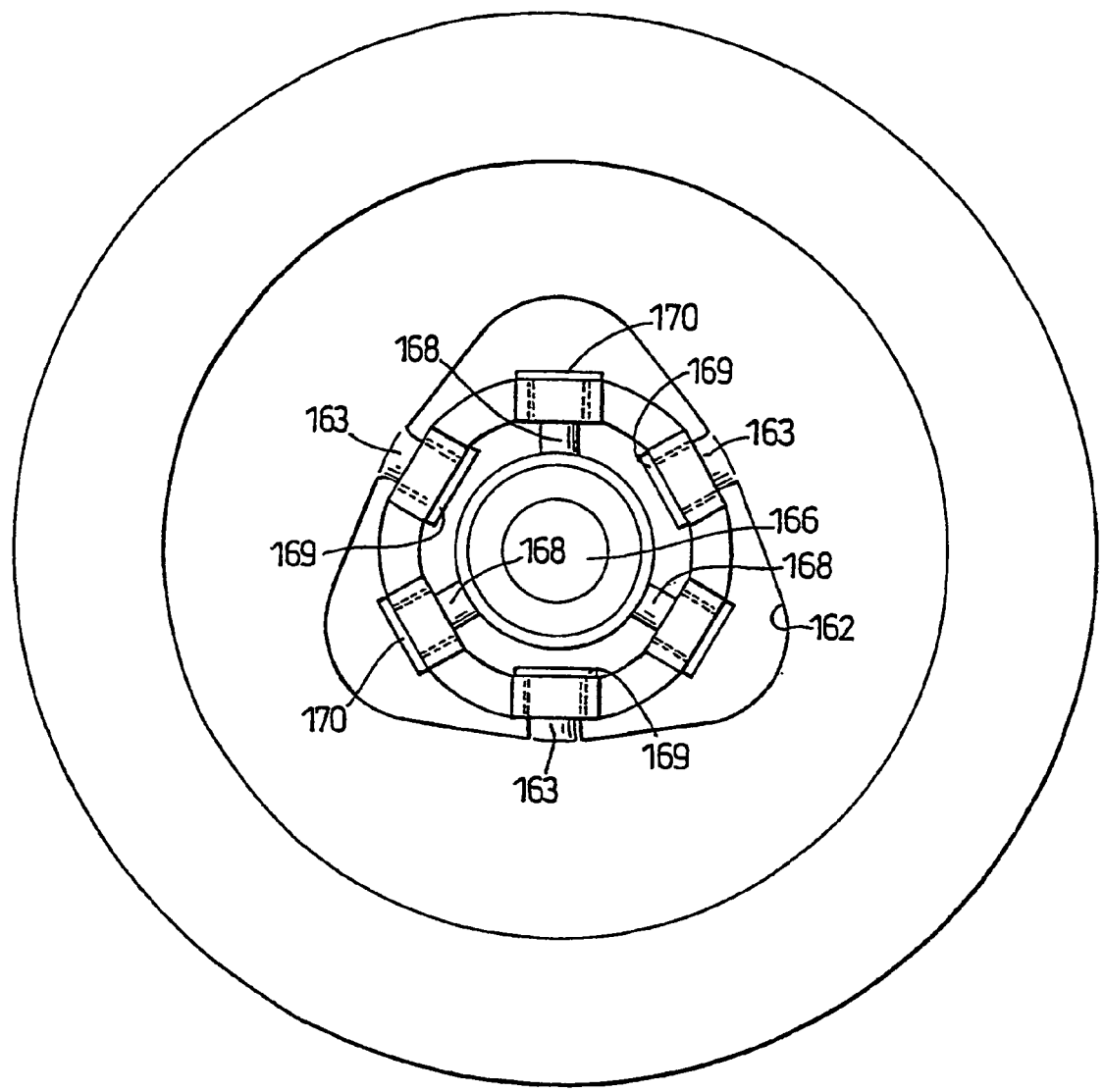
FIG. 13 is an end view of the wheel of FIG. 12.

Referring now to FIGS. 12 and 13, a wheel, for example a road wheel of a vehicle, is shown at 160. The wheel has a disc 161 which has a generally triangular aperture 162. Projecting radially inwardly from each side of the aperture is a pin, two of which are shown at 163. A ring 164 similar to that shown in FIG. 2 is provided with six equi-angularly spaced sockets some of which are indicated at 165. A third member 166, which could be a drive shaft for the wheel, is provided with a cutaway tubular portion 167 which has three equi-angularly-spaced cylindrical trunnions, two of which are indicated at 168.

Three of the sockets 165 fit over the pins 163 and the other three sockets 165 receive the trunnions 168. Inserts such as 169 are inserted from the center of the aperture 162 so as to receive the pins 163. The inserts 169 are a snap fit in the sockets 165 as described in relation to FIG. 11.

Similarly, inserts 170 are inserted in a radially inward direction over the pins 168 which are received in the other sockets in the ring 164, again the inserts 170 are a snap fit into the sockets. The inserts have bores such as 171 which receive the pins such as 163 or 168 and allow for rotation and sliding of the pins in the bores.

Figure 14:
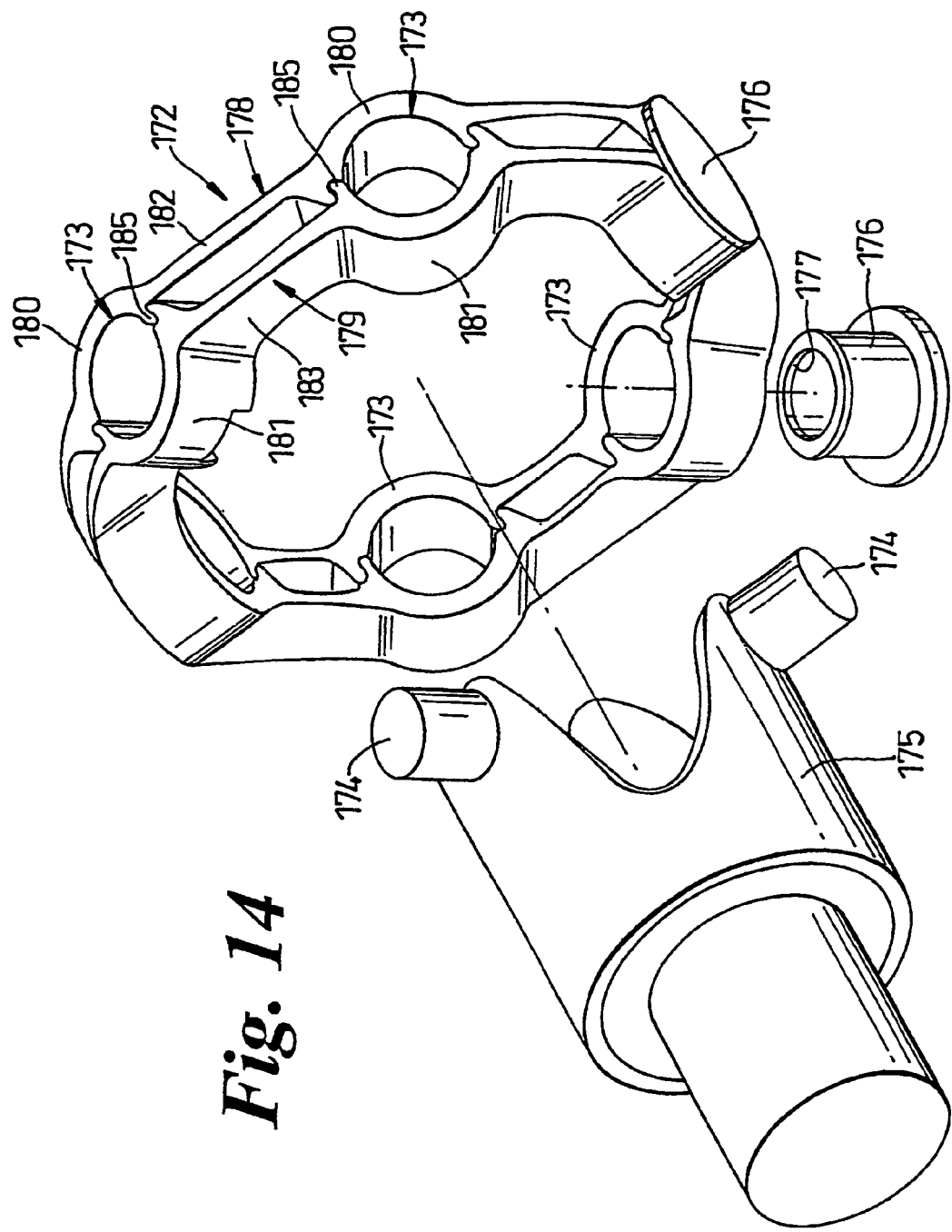
FIG. 14 is a perspective view showing a coupling in which the ring carrying the sockets comprises two detachable parts.

FIG. 14 shows a coupling which is similar to that shown in FIG. 2 except that the second member such as 28 in FIG. 2 is in this case made in two identical parts. Thus referring to FIG. 14 the member 172 provides six sockets 173 equi-angularly spaced around the ring. The sockets receive the pins 174 on a member 175 as described and the sockets also receive inserts 10' 176 which are snap fits in the sockets 173. The inserts 176 have bores 177 in which the pins 174 are received so as to be able to rotate and slide. A further member such as shown in FIG. 2 at 25a completes the coupling.

The ring 172 comprises two identical parts 178 and 179. Each part provides half of each of the sockets 173, the halves being indicated at 180 and 181 respectively. Each socket portion 180 181 is connected to its adjacent socket portion by a flexible web 182 183 respectively. The portions 182 183 are provided with inter-fitting formations indicated generally at 185 which snap together to hold the ring parts 178 179 together. When the inserts 176 are inserted into the sockets 173 it will be seen that the ring parts cannot become disengaged.

It will be seen that in each of the embodiments the first and second members are connected by pin and socket joints which are equi-angularly spaced around the rotary axes of the members. Where a third member is provided as in FIGS. 2 to 14, the second member and the third member are also connected by pin and socket joints. The flexibility of the coupling is provided in the arrangement of FIGS. 2 to 14 by flexibly interconnecting the sockets. In FIG. 1A the parts 14 provide a flexible interconnection of the sockets via the element 11.

In FIG. 1A the flexibility of the coupling is provided by the flexible elements 14. However the trunnions 21 could be flexibly mounted on the second member 17 in place of, or in addition to, the flexible elements 14.

In FIGS. 2 to 14 the flexibility of the coupling is provided by the flexible elements between the sockets. However trunnions such as 21 on the first member and/or on the third member of each of these couplings could be flexibly mounted on the member in place of or in addition to the provisions of the flexible elements between the sockets.

In FIGS. 2 to 14 also, the sockets or pins on the second members of the coupling could, instead of being inter-connected by flexible elements, be connected by flexible elements to a rigid ring or the like.

To ease assembly the trunnions in each of the embodiments may be detachably secured to the members and secured to the members that carry them after these have been located relative to the flexible ring.

As described the trunnions may be spherical or cylindrical and in most cases the use of cylindrical trunnions is to be preferred so as to avoid twisting of the sockets during the transmission of torque.

It will also be understood that although the device of the present invention has been described in terms of a rotating coupling, it could be used as a static coupling for flexibly connecting two non-rotating parts in such a way as to enable moments to be transmitted therebetween.

The invention claimed is:

1. A flexible coupling capable of transmitting torque and comprising:
    a first member having a rotary axis and comprising at least three pins;
    a second member comprising at least six sockets; and
    a third member having a rotary axis and comprising at least three pins,
    wherein the first member is connected to the second member by at least three joints and the second member is connected to the third member by at least three joints, the joints being circumferentially spaced about said axes,
    wherein each joint comprises a pin carried by the first or third member and a socket carried by the second member, the pin registering into the socket so that torque can be transmitted between the respective joint members and so that relative sliding and rotational movement can take place between each pin and associated socket, wherein the sockets of the second member are connected by flexible extensions to each other such that the first and third members can articulate relative to one another; and wherein longitudinal axes formed by the socket and pin joints lie in a single plane.

2. A flexible coupling according to claim 1 wherein the pins of at least the first or third member are flexibly mounted thereto.

3. A flexible coupling according to claim 1 wherein the pins have cylindrical surfaces which engage with cylindrical bores on the sockets.

4. A flexible coupling according to claim 1 wherein the pins have part-spherical heads received in cylindrical bores in the sockets.

5. A flexible coupling according to claim 1 wherein the sockets are mounted on a ring and interconnected by flexible elements.

6. A flexible coupling according to claim 5 wherein the sockets are connected by flexible elements which are bowed in shape.

7. A flexible coupling according to claim 5 wherein the sockets are formed by inserts received in bores in said ring, the bores being flexibly interconnected.

8. A flexible coupling according to claim 5 wherein the first member comprises a wheel having internally projecting radial pins.

9. A flexible coupling according to claim 8 wherein the sockets include inserts in the form of bushes in which the pins are received.

10. A flexible coupling according to claim 9 wherein the inserts are snap-fit into the sockets.

11. A flexible coupling according to claim 5 wherein the first and third members comprise outwardly projecting pins received in alternate sockets on the ring.

12. A flexible coupling according to claim 11 wherein all the sockets are arranged to project inwardly from the ring.

13. A flexible coupling according to claim 5 wherein the sockets alternatingly project inwardly and outwardly, and wherein one of the first or third members has inwardly projecting pins and the other of the first or third member has outwardly projecting pins, the pins being received in inwardly and outwardly directed sockets, respectively.

14. A flexible coupling according to claim 5 wherein said ring comprises two parts which are detachably secured together, each said ring part proving a portion of each socket such that when the ring parts are secured together, the socket portions are aligned to the form the sockets.

15. A flexible coupling according to claim 14 wherein the ring parts are identical.

16. A flexible coupling according to claim 14 wherein the ring parts are prevented from becoming detached from each other by inserts received in the sockets and which receive the pins.

* * * * *

UNITED STATES PATENT AND TRADEMARK OFFICE
CERTIFICATE OF CORRECTION

PATENT NO. : 7,641,557 B2  Page 1 of 1
APPLICATION NO. : 10/521911
DATED : January 5, 2010
INVENTOR(S) : Stephen C. Bartlett It is certified that error appears in the above-identified patent and that said Letters Patent is hereby corrected as shown below:

Title Page, Item (57), in the Abstract; line 11, please change --teach-- to each.

Signed and Sealed this

Sixteenth Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,641,557 B2
APPLICATION NO. : 10/521911
DATED : January 5, 2010
INVENTOR(S) : Stephen Charles Bartlett It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 637 days.

Signed and Sealed this

Sixteenth Day of November, 2010

David J. Kappos
*Director of the United States Patent and Trademark Office*